(12) United States Patent
Sahlberg

(10) Patent No.: US 6,435,337 B1
(45) Date of Patent: Aug. 20, 2002

(54) ROTARY DRIVE FOR VIBRATORY CONVEYORS

(75) Inventor: Karl M. Sahlberg, Grillby (SE)

(73) Assignee: Vibro Industries, Inc., Port Royal, PA (US)

( * ) Notice: Subject to any disclaimer, the term of this patent is extended or adjusted under 35 U.S.C. 154(b) by 106 days.

(21) Appl. No.: 09/715,505

(22) Filed: Nov. 17, 2000

(51) Int. Cl.[7] ............................................... B65G 27/16
(52) U.S. Cl. ............................................ 198/766; 74/26
(58) Field of Search ........................... 198/752.1, 750, 198/763, 766; 74/26, 55

(56) References Cited

U.S. PATENT DOCUMENTS

| | | | |
|---|---|---|---|
| 4,019,626 A | 4/1977 | Kamner | 198/750 |
| 4,339,029 A | 7/1982 | Wilson | 198/750 |
| 4,436,199 A | 3/1984 | Baba et al. | 198/750 |
| 5,351,807 A | 10/1994 | Svejkovsky | 198/750 |
| 5,404,996 A | 4/1995 | Durnil | 198/761 |
| 5,579,890 A | 12/1996 | Harris | 198/377 |
| 5,699,897 A | 12/1997 | Svejkovsky | 198/750.1 |
| 5,794,757 A | 8/1998 | Svejkovsky et al. | 198/750.8 |
| 5,850,906 A | 12/1998 | Dean | 198/750.8 |
| 6,037,549 A | * 3/2000 | Weck | 198/766 |
| 6,079,548 A | 6/2000 | Svejkovsky et al. | 198/750.6 |

* cited by examiner

Primary Examiner—Kenneth W. Noland
(74) Attorney, Agent, or Firm—Duane Morris LLP

(57) ABSTRACT

A vibratory conveyor drive is provided that is operatively connected to a vibratory conveyor tray for use in generating reciprocating movement in the tray so that a variety of goods may be transported along the tray. The conveyor drive includes a drive wheel having a radial slot formed in it. The drive wheel is supported for rotation about a first axis of rotation and is operatively connected to a source of rotational motive force, such as an electric motor. A transfer wheel is supported for rotation about a second axis of rotation, and is positioned in substantially parallel-spaced relation to the drive wheel. The transfer wheel includes a first shaft projecting outwardly from a first surface, with a drive-follower positioned on an end of the first shaft. The drive-follower is received within the radial slot of the drive wheel. An axle projects outwardly from a second surface of the transfer wheel, and is positioned in coaxial relation with the second axis of rotation. A reciprocating arm having first and second ends is secured to the axle at the first end in substantially parallel-spaced relation to the transfer wheel. The reciprocating arm includes a drive shaft projecting outwardly from the second end, and has a tray-follower positioned on it and mounted on to a portion of the tray so as to provide the reciprocating movement to the tray. A vibratory conveyor system for conveying materials is also provided including the foregoing drive mechanism.

18 Claims, 6 Drawing Sheets

ROTARY DRIVE FOR VIBRATORY CONVEYORS

FIELD OF THE INVENTION

The present invention generally relates to vibratory (shaker) conveyors for moving goods along a conveyor tray, and more particularly to a rotary drive mechanism for powering vibratory conveyors.

BACKGROUND OF THE INVENTION

A vibratory conveyor includes a generally elongate horizontal or slightly inclined tray or pan having a planar surface. The tray is moved slowly forward to shift the goods, relative to the planar surface of the tray, and is then pulled rearwardly at a high return speed so that the goods slide along the planar surface of the tray. In this way, the goods are effectively transported along the conveyor tray. Vibratory conveyors, which are sometimes referred to as differential impulse conveyors, linear motion conveyors, or shaker conveyors provide a significant advantage in that goods may be transported along the tray in a manner that does not require engagement with the parts by secondary fixtures or the like (no moving tray parts) which could damage the goods.

Various prior art mechanisms for driving vibratory conveyors are known in the art including reciprocating pistons, driven three and four bar linkages, and mechanisms employing a plurality of flywheels suspended from the tray. For example U.S. Pat. Nos.: 6,079,548; 5,850,906; 5,794,757; 5,699,897; 5,579,890; 5,404,996; 5,351,807; 4,436,199; 4,339,029; and 4,019,626 disclose drive mechanisms suitable for use with vibratory conveyors. Prior art drive mechanisms that utilize one or more flywheels such that the momentum of the rotating flywheels achieve the desired slow forward speed and high return speed for the conveyor tray have been found to be costly and not easily optimized to adjust the ratio of forward acceleration to return acceleration to achieve the desired product speed along the tray.

In U.S. Pat. No. 4,339,029, issued to Wilson, a shaker conveyor is provided that uses rotary motion to develop reciprocating motion in a parts conveyor tray. The use of a shaker conveyor results in the use of a smaller drive system achieving the desired movement of the articles along the shaker conveyor. Wilson's rotary drive system includes a fly wheel that is connected to a power source. The fly wheel's axle is centrally and rotatably mounted on to the fly wheel, with the upper face of the fly wheel being parallel to the surface of the tray. An eccentric is secured to the upper face of the fly wheel by welding, bolting, or machining so that it is always disposed in fixed spaced relation to the central rotational axis of the fly wheel. A reciprocating plate having a bearing is attached to the other end of the eccentric. The reciprocating plate is mounted within a reciprocating plate bearing, and is secured to the tray. It is the rotation of the fly wheel in combination with the eccentric communicating with the reciprocating plate and an eccentric bearing which results in the reciprocating motion of the tray. The reciprocating motion of the tray is linear and parallel to the fly wheel and the reciprocating plate. Thus Wilson discloses a fly wheel revolving about a fly wheel axle to transmit reciprocating motion through a fixed eccentric, and thereby permitting rotary motion to be converted directly into linear reciprocating motion.

SUMMARY OF THE INVENTION

A vibratory conveyor drive is provided that is operatively connected to a vibratory conveyor tray for use in generating reciprocating movement in the tray so that a variety of goods may be transported along the tray. The vibratory conveyor drive is adapted for use in a vibratory conveyor system for conveying materials, and is often supported by a frame with the tray slidingly supported by the frame. The conveyor drive of the invention includes a drive wheel having a radial slot formed in it. The drive wheel is supported for rotation about a first axis of rotation and is operatively connected to a source of rotational motive force, such as an electric motor. A transfer wheel is supported for rotation about a second axis of rotation, and is positioned in substantially parallel-spaced relation to the drive wheel. The transfer wheel includes a first shaft projecting outwardly from a first surface, with a drive-follower positioned on an end of the first shaft. The drive-follower is received within the radial slot of the drive wheel. An axle projects outwardly from a second surface of the transfer wheel, and is positioned in coaxial relation with the second axis of rotation. A reciprocating arm having first and second ends is secured to the axle at the first end in substantially parallel-spaced relation to the transfer wheel. The reciprocating arm includes a drive shaft projecting outwardly from the second end, and has a tray-follower positioned in a tray driver that is mounted on to a portion of the tray so as to transfer the reciprocating movement to of the vibratory conveyor drive the tray.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
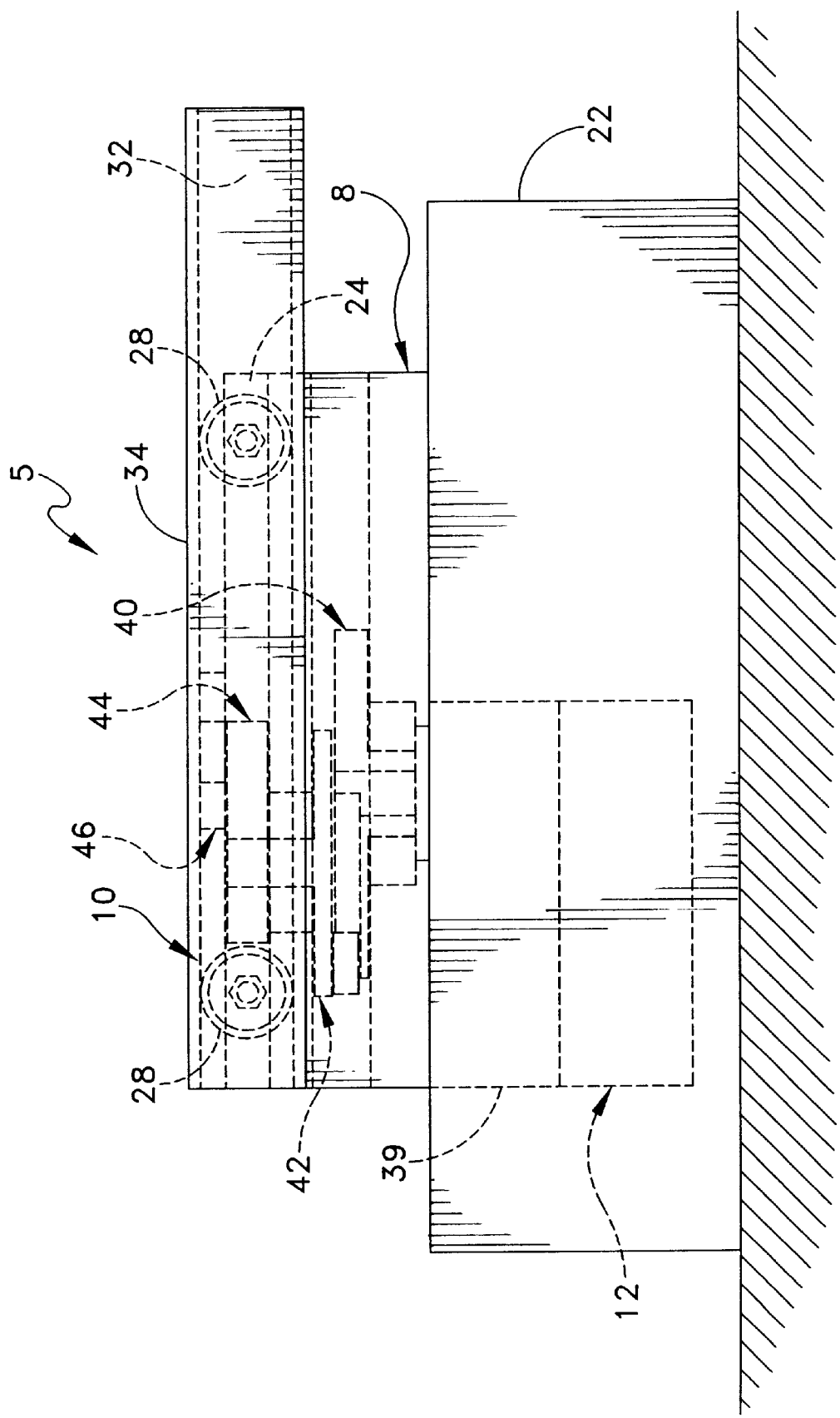
FIG. 1 is a side elevational view of a vibratory conveyor system formed in accordance with the present invention.

The description of preferred embodiments is intended to be read in connection with the accompanying drawings, which are to be considered part of the entire written description of this invention. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
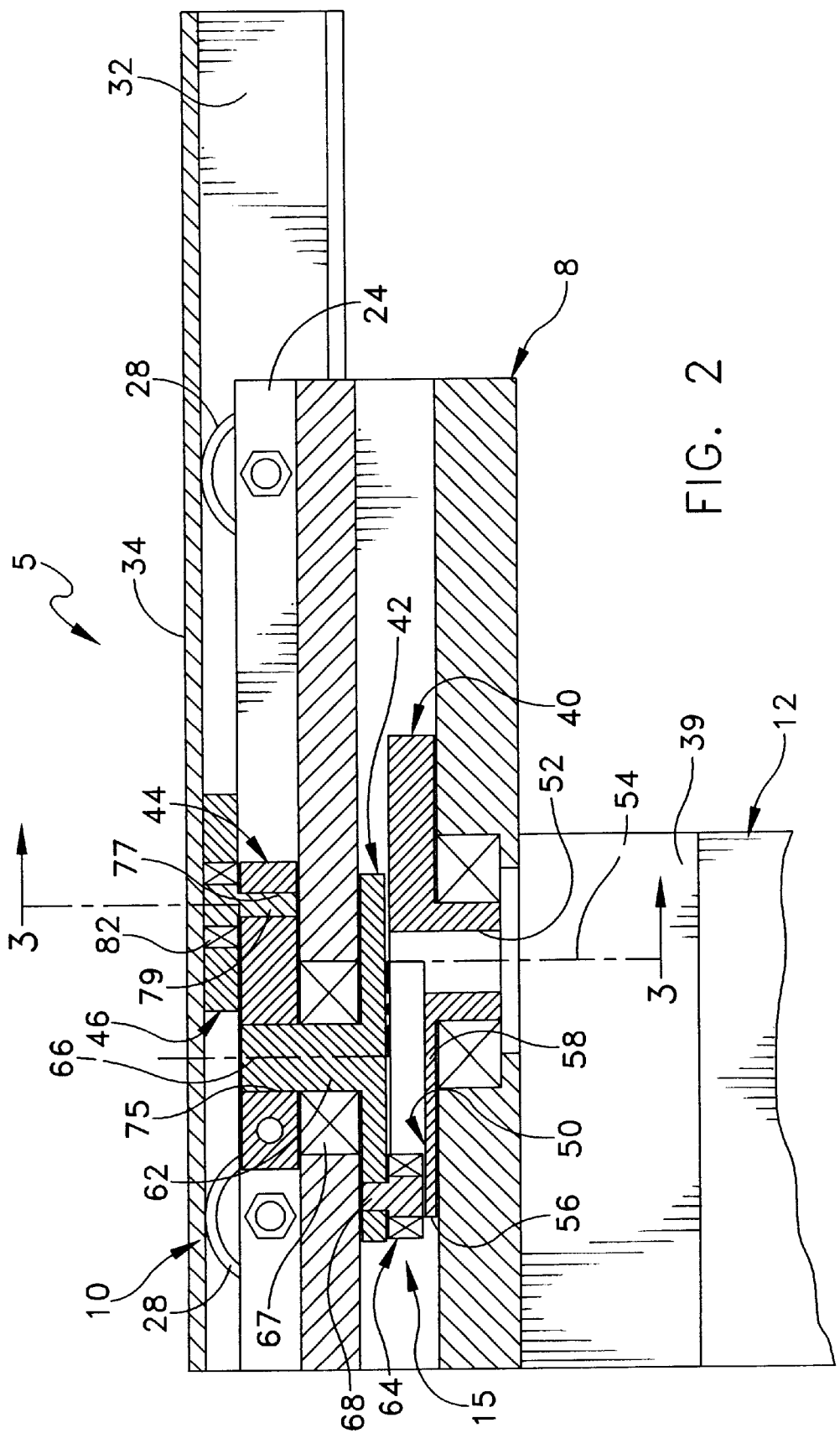
FIG. 2 is a cross-sectional view of the vibratory conveyor system shown in FIG. 1, as taken along line 2—2.
Figure 3:
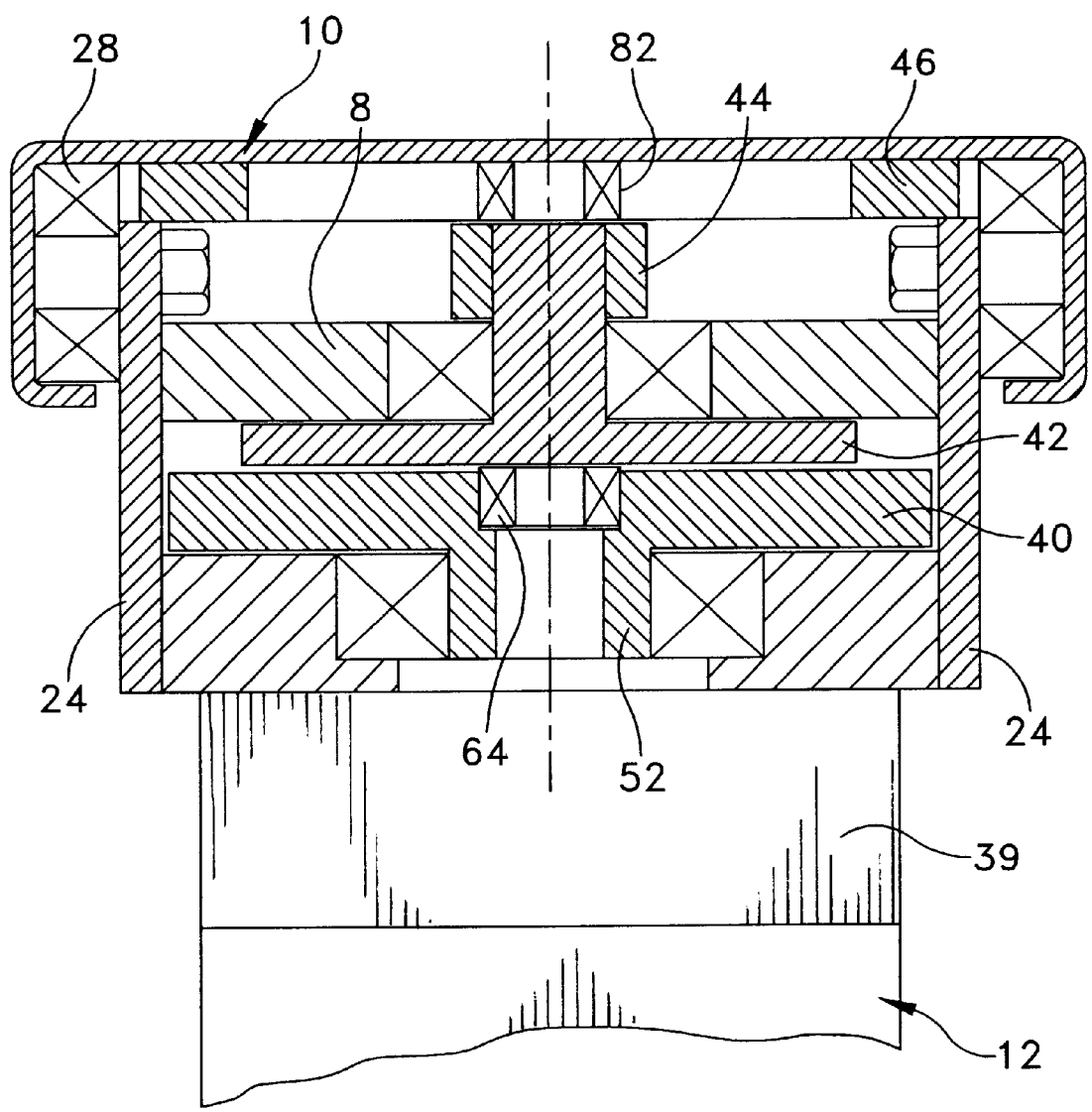
FIG. 3 is a cross-sectional view of the vibratory conveyor system shown in FIG. 1, as taken along line 3—3 in FIG. 1.

Referring to FIGS. 1–3, a vibratory conveyor 5 formed in accordance with the invention includes a frame 8, a tray 10, a power source 12, and a rotary drive mechanism 15. More particularly, frame 8 supports tray 10, power source 12, and rotary drive mechanism 15, and includes a base 22 and tray supports 24. Base 22 is of the type adapted for placement on a shop or factory floor. Tray supports 24 are normally mounted to base 22, and are sized and shaped to position tray 10 at an appropriate height for interfacing with factory workers or other manufacturing equipment (not shown). A portion of base 22, typically directly below tray 10 is adapted to support rotary drive mechanism 15 in operative proximity to the underside of tray 10. Rollers 28 are positioned on tray supports 24 so as to support the longitudinal reciprocating movement of tray 10 during operation of vibratory conveyor 5. In one embodiment, roller tracks 32 project from the bottom surface of tray 10 in positions that correspond to the location of rollers 28 on tray supports 24. Tray supports 24 are secured to base 22 in spaced relation to one another. It will be understood that many combinations of known rollers and supports may be used to support the longitudinal reciprocating movement of tray 10.

Figure 4:
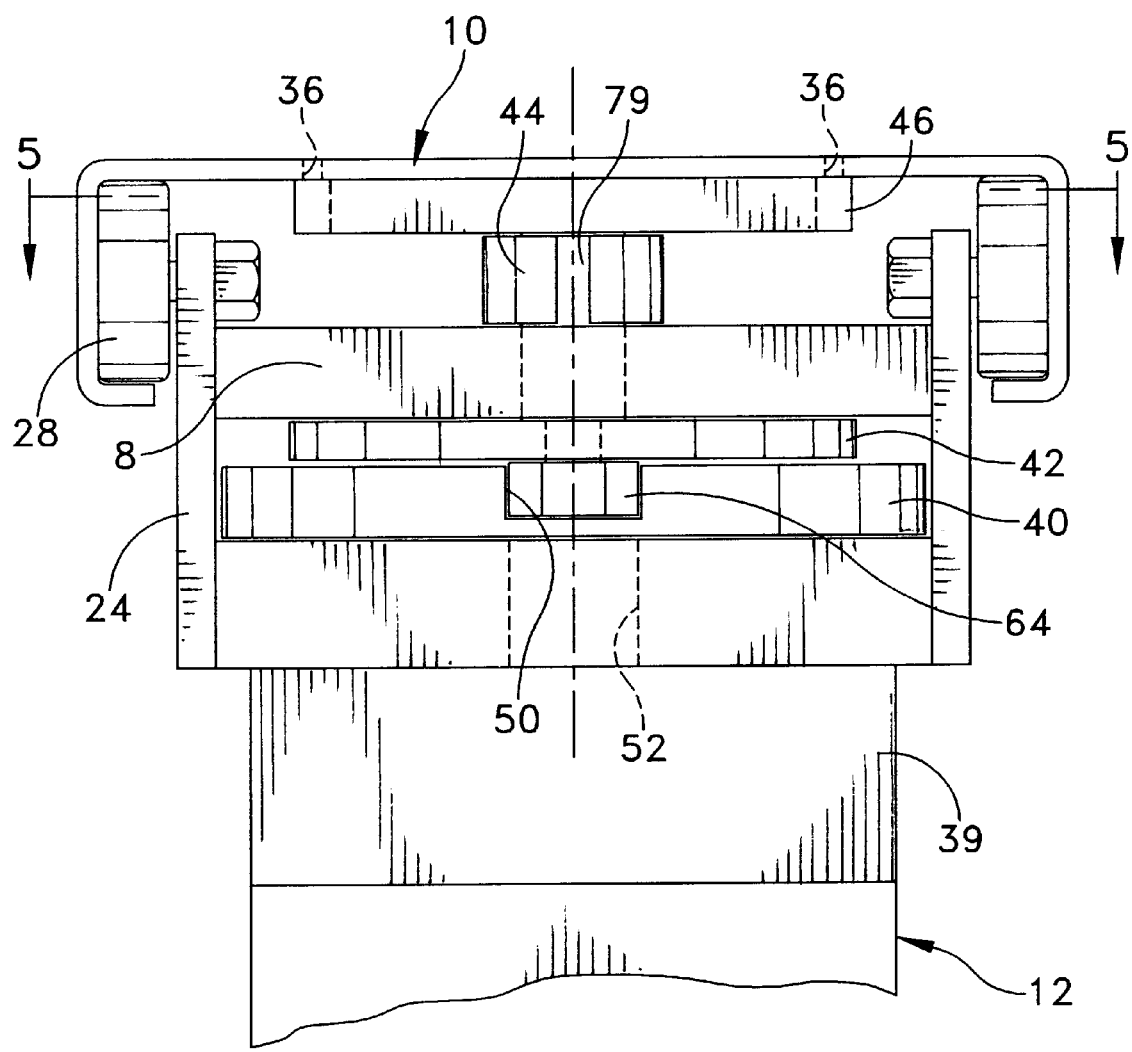
FIG. 4 is an end elevational view of the vibratory conveyor system shown in FIG. 1.

Tray 10 includes a top surface 34 that may be textured or smooth, as needed, for conveying goods customarily transported by a vibratory conveyor. Tray 10 is generally horizontally disposed on frame 8, but may be inclined to suit particular applications. Mounting bores 36 are provided for securing tray 10 to rotary drive mechanism 15, via conventional fasteners such as screws, or the like (FIG. 4). Of course, tray 10 may be secured to rotary drive mechanism 15 in any other suitable fashion, e.g., tray 10 may be rubber cushion supported, welded or bolted, etc. It will be understood that the supporting surface of tray 10 may be slightly inclined from horizontal so that goods can be moved generally horizontally and either uphill or downhill. Rotary drive mechanism 15 may be adapted for driving a conveyor with a linear horizontal tray, a linear inclined tray, or a spiraling tray.

Power source 12 preferably comprises a conventional source of rotational motive force, e.g., an electric motor. A conventional system of reduction gears may be used in combination with power source 12, as a transmission 39, so that varying rates of rotational motive force may be applied to rotary drive mechanism 15.

Rotary drive mechanism 15 includes a drive. wheel 40, a transfer wheel 42, a transfer arm 44, and a reciprocating tray driver 46. More particularly, drive wheel 40 comprises a substantially circular plate formed from steel or the like, that includes a blind radial slot 50 and a drive axle 52. Blind radial slot 50 extends from a center axis of rotation 54 and opens onto an edge surface 56. A bottom portion of drive wheel 40 forms an interior radial wall 58 that bounds blind radial slot 50. Drive axle 52 projects outwardly from the center of drive wheel 40, in coaxial relation with center axis of rotation 54, and is adapted to be operatively connected to a source of rotational motive force, such as power source 12, via transmission 39.

Transfer wheel 42 comprises a substantially circular plate formed from steel or the like, that includes a transfer axle 62 and a drive follower 64. Transfer axle 62 projects outwardly from the center of transfer wheel 42, in coaxial relation with a center axis of rotation 66, and is adapted to be operatively connected to transfer arm 44. Transfer axle 62 is preferably journaled with bearings 67 or the like to the interior portion of frame 8 that forms a portion of rotary drive mechanism 15. Transfer wheel 42 is supported for rotation about center axis of rotation 66 and is support and positioned within rotary drive mechanism 15 in substantially parallel-spaced relation to drive wheel 40. A shaft 68 projects outwardly in substantially perpendicular relation to the surface of transfer wheel 42, and is spaced radially from center axis of rotation 66. Drive-follower 64 is positioned on an end of shaft 68 and arranged so as to be slidingly received within blind radial slot 50 of drive wheel 40. Drive-follower 64 comprises a substantially circular bearing having a diameter that is substantially the same as the width of blind radial slot 50, and with a hardened outer surface that is adapted for long term sliding engagement with the portions of drive wheel 40 that define the edges of blind radial slot 50.

Transfer arm 44 comprises an elongate block of steel having an axle-bore 75 defined through a first end and a shaft-bore 77 defined through a second end. Axle-bore 75 is sized and shaped to receive an end portion of transfer axle 62 so that transfer arm 44 is arranged in substantially parallel-spaced relation to transfer wheel 42. Drive shaft 79 is positioned within shaft-bore 77 so that a portion of drive shaft 79 projects outwardly from the second end of transfer arm 44. Tray-follower 82 is positioned on an end of drive shaft 79 and arranged so as to be slidingly received within a portion of reciprocating tray driver 46. Tray-follower 82 comprises a substantially circular bearing with a hardened outer surface that is adapted for long term sliding engagement with reciprocating tray driver 46.

Reciprocating tray driver 46 comprises a substantially rectangular plate including a centrally positioned rectangular opening 90 that is defined by opposing sidewalls 92a, 92b,92c,92d. A plurality of through-bores 94 are formed in sidewalls 92a,92b,92c,92d for receipt of fasteners, such as screws or the like. Rectangular opening 90 is sized and shaped to receive tray-follower 82 in such a that transfer follower 82 may traverse the length of side walls 92b and 92d way during rotational movement of transfer arm 44, as will hereinafter be disclosed in further detail.

Rotary drive mechanism 15 generates cyclic accelerations and decelerations of tray 10 in the following manner. Referring to FIGS. 2, 5, and 6A–6C, as drive wheel 40 rotates about axis of rotation 54, under the influence of power source 12, drive follower 64 reciprocates within blind radial slot 50 between (i) a first position adjacent to center axis of rotation 54 and (ii) a second position adjacent to edge surface 56 of drive wheel 40. This construction simultaneously causes transfer wheel 42 to rotate about axis of rotation 66 under the direct influence of drive follower 64 and shaft 75.

Figures 6A, 6B, 6C:
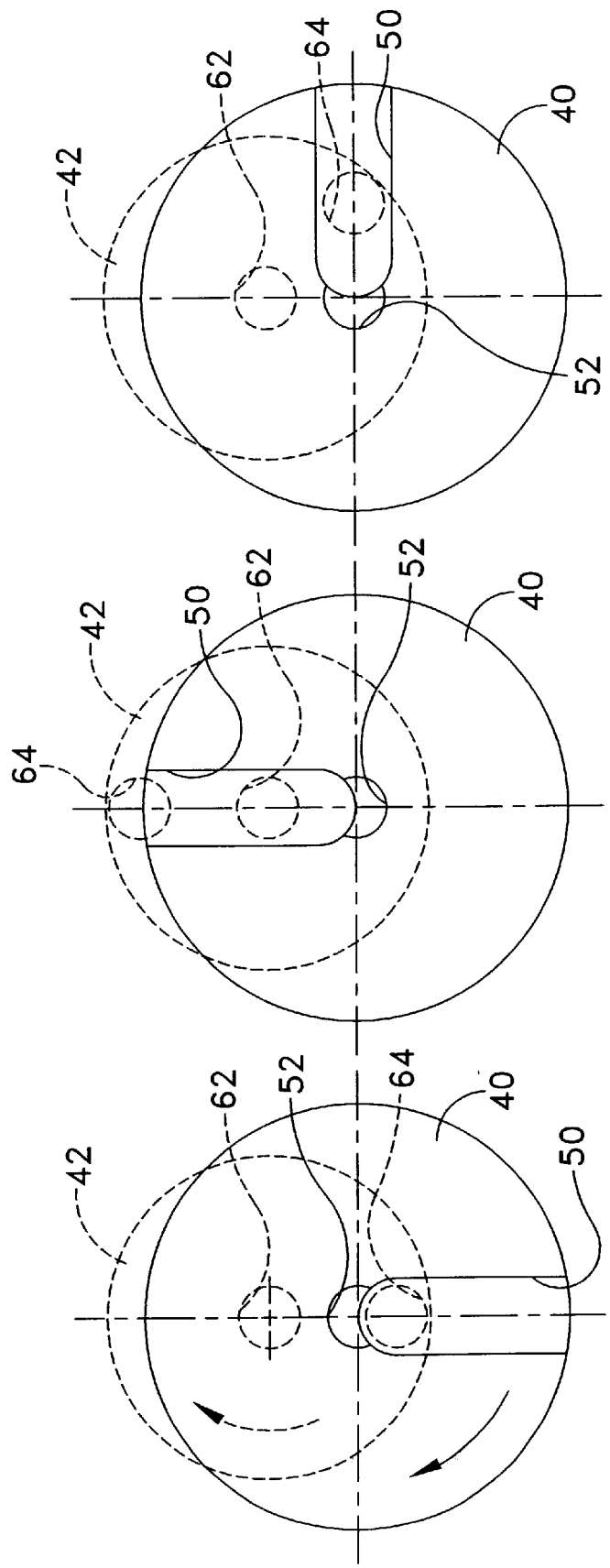
FIGS. 6A, 6B, and 6C are a schematic representation of the rotational relationship between the drive wheel, transfer wheel, and drive-follower at different rotational positions.

Advantageously, as drive follower 64 approaches drive axle 52 of drive wheel 40, the rotational speed of transfer wheel 42 approaches a minimum (FIG. 6A). As drive follower 64 approaches edge surface 56 of drive wheel 40, the rotational speed of transfer wheel 42 approaches a maximum (FIG. 6B). While drive follower 64 is traversing the central portion of blind radial slot 50 it is either accelerating, i.e., moving away from drive axle 52 and toward edge surface 56, or decelerating, i.e., moving away from edge surface 56 and toward drive axle 52 (FIG. 6C).

Figure 5:
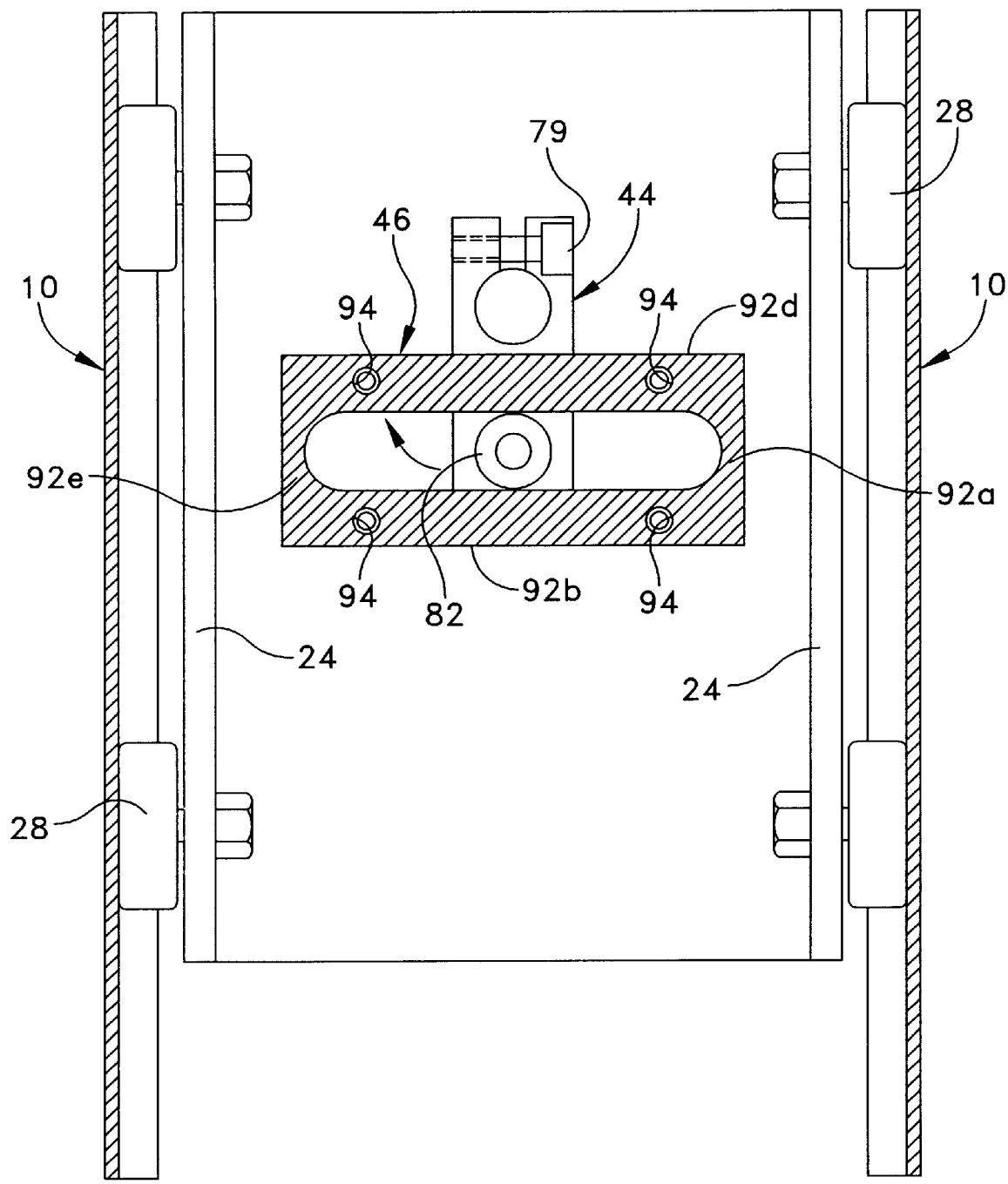
FIG. 5 is a top, cross-sectional view, as taken along line 5—5 in FIG. 4, showing a portion of the tray and roller and the tray follower and tray driver.

This reciprocating acceleration and deceleration of transfer wheel 42 is transferred to arm 44, via the engagement of arm 44 with transfer axle 62, which in turn rotates in the same cyclically accelerating and decelerating fashion as transfer wheel 42. Referring to FIG. 5, as arm 44 rotates tray follower 82 slides back-and-forth within rectangular opening 90, between side walls 92a,92c, and along side walls 92b,92d. This movement causes tray follower 46 and tray 10 to reciprocate in a linear fashion that completes a cycle with each rotation of arm 44 and in synchronized relation with the rotation of transfer wheel 42. In this way, the forward speed of tray follower 46 is at a lower magnitude than the rearward speed corresponding to the deceleration of drive follower 64 as it slides toward the top portion of drive axle 52. As this occurs, the frictional engagement of the goods lying upon the top surface of tray 10 is not overcome and they move forwardly with tray 10. In turn, the rearward speed of tray follower 46 is at a higher magnitude than the forward speed corresponding to the acceleration of drive follower 64 as it slides away from the top portion of drive axle 52 and toward edge surface 56 of drive wheel 40. The magnitude of the reward acceleration cycle is such that the frictional engagement of the goods with the surface of tray 10 is overcome. Thus substantially only tray 10 is accelerated rearwardly, with the goods sliding along the surface of the tray but not moving rearwardly.

It is to be understood that the present invention is by no means limited only to the particular constructions herein disclosed and shown in the drawings, but also comprises any modifications or equivalents within the scope of the claims.

What is claimed is:

1. A vibratory conveyor drive operatively connected to a vibratory conveyor tray for use in generating reciprocating movement in said tray, said conveyor drive comprising:

a drive wheel having a radial slot supported for rotation about a first axis of rotation and operatively connected to a source of rotational motive force;

a transfer wheel supported for rotation about a second axis of rotation and positioned in substantially parallel-spaced relation to said drive wheel and including, a first, shaft projecting outwardly from a first surface having a drive-follower positioned on an end of said first shaft and received within said radial slot of said drive wheel; and an axle projecting outwardly from a second surface positioned in coaxial relation with said second axis of rotation; and a reciprocating arm having first and second ends and being secured to said axle at said first end in substantially parallel-spaced relation to said transfer wheel and including a drive shaft projecting outwardly from said second end, said drive shaft having a tray-follower positioned on said drive shaft and mounted on to a portion of said tray.

2. A vibratory conveyor drive according to claim 1 wherein said first axis of rotation and said second axis of rotation are parallel and spaced apart.

3. A vibratory conveyor drive according to claim 1 wherein said drive wheel comprises a substantially circular plate including a drive axle and wherein said radial slot extends from said first axis of rotation and opens onto an edge surface of said drive wheel.

4. A vibratory conveyor drive according to claim 3 wherein said drive axle projects outwardly from said drive wheel in coaxial relation with said axis of rotation.

5. A vibratory conveyor drive according to claim 1 wherein said transfer wheel comprises a substantially circular plate and is supported and positioned so as to be disposed in substantially parallel-spaced relation to said drive wheel.

6. A vibratory conveyor drive according to claim 1 wherein said first shaft projects outwardly in substantially perpendicular relation to said first surface of said transfer wheel and is spaced radially from said axle.

7. A vibratory conveyor drive according to claim 1 wherein said drive-follower is arranged so as to be slidingly received within said radial slot of said drive wheel.

8. A vibratory conveyor drive according to claim 1 wherein said reciprocating arm comprises an elongate block having an axle-bore defined through said first end and a shaft-bore defined through said second end wherein said axle-bore is sized and shaped to receive an end portion of said axle so that reciprocating arm is arranged in substantially parallel-spaced relation to said transfer wheel.

9. A vibratory conveyor drive according to claim 8 wherein said drive shaft is positioned within said shaft-bore so that a portion of drive shaft projects outwardly from said second end of said reciprocating arm.

10. A vibratory conveyor drive according to claim 8 wherein said tray-follower is positioned on an end of said drive shaft and arranged so as to be slidingly received within a tray driver that is fastened to a portion of said tray.

11. A vibratory conveyor drive according to claim 10 wherein said tray driver comprises a substantially rectangular plate including a centrally positioned rectangular opening that is defined by opposing sidewalls, wherein said rectangular opening is sized and shaped to receive said tray-follower and allow said tray-follower to traverse the length of said rectangular opening during rotational movement of said reciprocating arm.

12. A vibratory conveyor drive according to claim 1 wherein as said drive wheel rotates about said first axis of rotation said drive follower reciprocates within said radial slot between a first position adjacent to said first axis of rotation and a second position adjacent to an edge of said drive wheel.

13. A vibratory conveyor drive according to claim 12 wherein as said drive follower nears said first position the rotational speed of said transfer wheel approaches a minimum and as said drive follower nears said second position the rotational speed of said transfer wheel approaches a maximum.

14. A vibratory conveyor drive according to claim 12 wherein as said drive follower is traversing a central portion of said radial slot and moving away from said first position it is accelerating.

15. A vibratory conveyor drive according to claim 12 wherein as said drive follower is traversing a central portion of said radial slot and moving toward from said first position it is decelerating.

16. A vibratory conveyor drive according to claim 1 wherein said transfer wheel reciprocally accelerates and decelerates driving said reciprocating arm which in turn rotates in the same cyclically accelerating and decelerating fashion thereby driving said tray-follower slidingly back-and-forth.

17. A vibratory conveyor drive operatively connected to a vibratory conveyor tray for use in generating reciprocating movement in said tray, said conveyor drive comprising:

a drive wheel having a radial slot supported for rotation about a first axis of rotation and operatively connected to a source of rotational motive force;

a transfer wheel supported for rotation about a second axis of rotation and positioned in substantially parallel-spaced relation to said drive wheel and including, a first shaft projecting outwardly from a first surface having a drive-follower positioned on an end of said first shaft and received within said radial slot of said drive wheel; and an axle projecting outwardly from a second surface positioned in coaxial relation with said second axis of rotation; and a reciprocating arm having first and second ends and being secured to said axle at said first end in substantially parallel-spaced relation to said transfer wheel and including a drive shaft projecting outwardly from said second end, said drive shaft having a tray-follower positioned on said drive shaft and mounted on to a portion of said tray;

wherein as said drive wheel rotates about said first axis of rotation said drive follower reciprocates within said radial slot between a first position adjacent to said first axis of rotation and a second position adjacent to an edge of said drive wheel, and further wherein as said drive follower nears said first position the rotational speed of said transfer wheel approaches a minimum and as said drive follower nears said second position the rotational speed of said transfer wheel approaches a maximum.

18. A vibratory conveyor system for conveying materials comprising a frame;

a tray supported by said frame;

a drive mechanism supported on said frame and operatively engaging said tray for generating reciprocating movement in said tray, said drive mechanism comprising:

a drive wheel having a radial slot supported for rotation about a first axis of rotation and operatively connected to a source of rotational motive force;

a transfer wheel supported for rotation about a second axis of rotation and positioned in substantially parallel-spaced relation to said drive wheel and including, a first shaft projecting outwardly from a first surface having a drive-follower positioned on an end of said first shaft and received within said radial slot of said drive wheel; and an axle projecting outwardly from a second surface positioned in coaxial relation with said second axis of rotation; and a reciprocating arm having first and second ends and being secured to said axle at said first end in substantially parallel-spaced relation to said transfer wheel and including a drive shaft projecting outwardly from said second end, said drive shaft having a tray-follower positioned on said drive shaft and mounted on a portion of said tray.

* * * * *